(12) United States Patent
Tang

(10) Patent No.: US 12,075,354 B2
(45) Date of Patent: *Aug. 27, 2024

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/316,367

(22) Filed: May 12, 2023

(65) Prior Publication Data

US 2023/0284138 A1 Sep. 7, 2023

Related U.S. Application Data

(63) Continuation of application No. 16/610,510, filed as application No. PCT/CN2017/083064 on May 4, 2017, now Pat. No. 11,812,380.

(51) Int. Cl.
*H04W 76/28* (2018.01)
*H04W 52/02* (2009.01)
(Continued)

(52) U.S. Cl.
CPC ....... *H04W 52/0216* (2013.01); *H04W 68/02* (2013.01); *H04W 72/23* (2023.01); *H04W 76/28* (2018.02)

(58) Field of Classification Search
CPC ...... Y02D 30/70; H04W 76/28; H04W 76/27; H04W 76/20; H04W 76/10; H04W 4/80
See application file for complete search history.

(56) References Cited

U.S. PATENT DOCUMENTS 10,499,451 B2 12/2019 Tabet et al.
11,265,960 B2 * 3/2022 Siomina .............. H04W 68/005
(Continued)

FOREIGN PATENT DOCUMENTS

CN 106105335 11/2016

OTHER PUBLICATIONS

CNIPA, Notification to Grant Patent for CN Application No. 201780090348.6, Jan. 20, 2023.
(Continued)

*Primary Examiner* — Jae Y Lee
*Assistant Examiner* — Aixa A Guadalupe Cruz
(74) *Attorney, Agent, or Firm* — Hodgson Russ LLP

(57) ABSTRACT

Provided by the embodiments of the present application are a wireless communication method and device. The method includes: receiving configuration information sent by a network device, the configuration information being used to configure a relationship between a detection result of a first signal or channel and whether to detect a second signal or channel; performing detection of the first signal or channel sent by the network device; and determining whether to detect the second signal or channel according to the detection result of the first signal or channel and the configuration information.

27 Claims, 3 Drawing Sheets

(51) Int. Cl.
*H04W 68/02* (2009.01)
*H04W 72/23* (2023.01)

(56) References Cited

U.S. PATENT DOCUMENTS

| | | | |
|---|---|---|---|
| 2014/0376436 A1 | 12/2014 | Kim et al. | |
| 2019/0239189 A1* | 8/2019 | Hwang | H04W 68/02 |
| 2020/0145921 A1* | 5/2020 | Zhang | H04W 52/0235 |
| 2021/0112495 A1* | 4/2021 | Liang | H04W 52/0235 |
| 2021/0195521 A1 | 6/2021 | Muller et al. | |

OTHER PUBLICATIONS

IPOS, Office Action for SG Application No. 11201910259V, Jun. 8, 2023.
USPTO, Notice of Allowance for U.S. Appl. No. 16/610,510, filed Jun. 14, 2023.
IMPI, Office Action for MX Application No. MX/a/2019/013067, Jun. 29, 2023.
EPO, Notice of Allowance for EP Application No. 17908550.1, Jul. 18, 2023.
NOIP, Office Action for VN Application No. 1-2019-06235, Oct. 31, 2023.
IPI, Office Action for IN Application No. 201917045655, Sep. 11, 2023.
USPTO, Corrected Notice of Allowability for U.S. Appl. No. 16/610,510, Sep. 27, 2023.
ISDEC, Office Action for CA Application No. 3063207, Oct. 26, 2023.
IMPI, Office Action for MX Application No. MX/a/2019/013067, Dec. 5, 2023.
EPO, Extended European Search Report for EP Application No. 23203260.7, Jan. 26, 2024.
MYIPO, Office Action for MY Application No. PI2019006438, Dec. 23, 2023.
NIIP, Office Action for BR Application No. BR112019023002-5, Jan. 25, 2024.

* cited by examiner

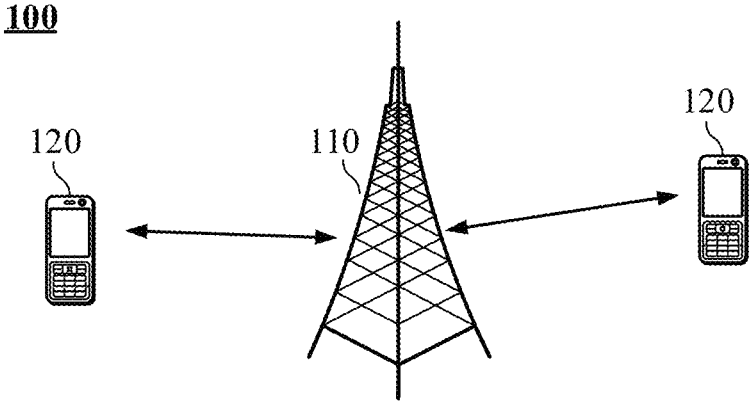

210
Detect, by a terminal device, a first signal or channel sent by a network device

220
Determine, by the terminal device, whether to detect a second signal or channel according to a detection result of the first signal or channel and a configuration made by the network device regarding a relationship between the detection result of the first signal or channel and whether to detect the second signal or channel

FIG. 2

WIRELESS COMMUNICATION METHOD AND DEVICE

CROSS-REFERENCE TO RELATED APPLICATIONS

This application is a continuation of U.S. application Ser. No. 16/610,510, filed Nov. 3, 2019, which is a U.S. national phase application of International Application No. PCT/CN2017/083064, filed May 4, 2017, the entire disclosures of which are incorporated herein by reference.

TECHNICAL FIELD

The present disclosure relates to communication technologies, and more particularly, to a wireless communication method and device.

BACKGROUND

For the sake of power saving of a terminal, a discontinuous reception (DRX) transmission mechanism is introduced in a long term evolution (LTE) system. A basic mechanism of DRX is to configure a DRX cycle for a terminal device in a radio resource control (RRC) connected state. The DRX cycle includes an on duration and an opportunity for DRX, and the on duration is used to detect PDCCH, and the opportunity for DRX is not used to detect the PDCCH. However, if the PDCCH is always detected during the on duration, the power of the terminal device is wasted.

Similarly, the terminal device can also perform detection on a paging message at a periodic paging occasion. However, the detection on the paging message at each paging occasion also wastes power.

Therefore, for a specific channel or signal (for example, the PDCCH or the paging message), how to determine whether the detection is needed is an urgent problem to be solved.

SUMMARY

Embodiments of the present disclosure provide a wireless communication method and device, which can reasonably determine whether a specific channel or signal needs to be detected.

In a first aspect, a wireless communication method is provided, including:
  detecting a first signal or channel sent by a network device; and
  determining whether to detect a second signal or channel according to a detection result of the first signal or channel and a configuration made by the network device regarding a relationship between the detection result of the first signal or channel and whether to detect the second signal or channel.

In connection with the first aspect, in a possible implementation manner of the first aspect, determining whether to detect a second signal or channel includes:
  determining whether to detect the second signal or channel at a specific detection time period or at a specific detection time point according to a detection result of the first signal or channel, and a configuration made by the network device regarding a relationship between the detection result of the first signal or channel and whether to detect the second signal or channel.

In connection with the first aspect or any one of the foregoing possible implementation manners, in a possible implementation manner of the first aspect, the specific detection time period or the specific detection time point is at least one detection time period or time point of periodic detection time periods or time points.

In connection with the first aspect or any one of the foregoing possible implementation manners, in a possible implementation manner of the first aspect, the specific detection time period or the specific detection time point is an on duration in a discontinuous reception DRX cycle; or, the specific detection time point is at least one paging occasion of periodic paging occasions.

In connection with the first aspect or any one of the foregoing possible implementation manners, in a possible implementation manner of the first aspect, determining whether to detect a second signal or channel includes:
  determining whether to detect the second signal or channel in the on duration of a current DRX cycle according to the detection result of the first signal or channel at a specific time or time period in the opportunity for DRX of a previous DRX cycle of the current DRX cycle, and the configuration made by the network device regarding the relationship between the detection result of the first signal or channel and whether to detect the second signal or channel; or
  determining whether to detect the second signal or channel at a current paging occasion according to the detection result of the first signal or channel at a specific time or time period before the current paging occasion and the configuration made by the network device regarding the relationship between the detection result of the first signal or channel and whether to detect the second signal or channel.

In connection with the first aspect or any one of the foregoing possible implementation manners, in a possible implementation manner of the first aspect, the second signal or channel is a physical downlink control channel PDCCH or paging signaling.

In connection with the first aspect or any one of the foregoing possible implementation manners, in a possible implementation manner of the first aspect, the method further includes:
  receiving configuration information sent by the network device, wherein the configuration information is used to configure the relationship between the detection result of the first signal or channel and whether to detect the second signal or channel.

In connection with the first aspect or any one of the foregoing possible implementation manners, in a possible implementation manner of the first aspect, the configuration information is carried in a system message, radio resource control RRC dedicated signaling, PDCCH signaling, or a media access control MAC control element CE.

In connection with the first aspect or any one of the foregoing possible implementation manners, in a possible implementation manner of the first aspect, the configuration information is carried in the first signal or channel and used to configure a relationship between the detection result of at least one first signal or channel after the first signal or channel where the configuration information is located and whether to detect the second signal or channel.

In connection with the first aspect or any one of the foregoing possible implementation manners, in a possible implementation manner of the first aspect, the configuration made by the network device regarding the relationship between the detection result of the first signal or channel and whether to detect the second signal or channel includes a first configuration.

In connection with the first aspect or any one of the foregoing possible implementation manners, in a possible implementation manner of the first aspect, the first configuration is used to indicate that detection of the second signal or channel is performed when the first signal or channel is not found.

In connection with the first aspect or any one of the foregoing possible implementation manners, in a possible implementation manner of the first aspect, the first configuration is used to indicate that detection of the second signal or channel is not performed when the first signal or channel is found.

In connection with the first aspect or any one of the foregoing possible implementation manners, in a possible implementation manner of the first aspect, the first configuration is used to indicate that:

detection of the second signal or channel is performed when the first signal or channel is found and a first field of the first signal or channel carries a first value; or detection of the second signal or channel is not performed when the first signal or channel is found and a first field of the first signal or channel carries a second value.

In connection with the first aspect or any one of the foregoing possible implementation manners, in a possible implementation manner of the first aspect, the configuration made by the network device regarding the relationship between the detection result of the first signal or channel and whether to detect the second signal or channel includes a second configuration.

In connection with the first aspect or any one of the foregoing possible implementation manners, in a possible implementation manner of the first aspect, the second configuration is used to indicate that detection of the second signal or channel is not performed when the first signal or channel is not found.

In connection with the first aspect or any one of the foregoing possible implementation manners, in a possible implementation manner of the first aspect, the second configuration is used to indicate that:

detection of the second signal or channel is performed when the first signal or channel is found.

In connection with the first aspect or any one of the foregoing possible implementation manners, in a possible implementation manner of the first aspect, the second configuration is used to indicate that:

detection of the second signal or channel is performed when the first signal or channel is found and a second field of the first signal or channel carries a third value; or detection of the second signal or channel is not performed when the first signal or channel is found and the second field of the first signal or channel carries a fourth value.

In connection with the first aspect or any one of the foregoing possible implementation manners, in a possible implementation manner of the first aspect, the method further includes:

determining whether to detect the second signal or channel according to a preset rule when the first signal or channel is found; wherein, the preset rule is used to indicate that detection of the second signal or channel is performed when the second field of the first signal or channel carries a fifth value; or that detection of the second signal or channel is not performed when the second field of the first signal or channel carries a sixth value.

In connection with the first aspect or any one of the foregoing possible implementation manners, in a possible implementation manner of the first aspect, the first signal or channel is a specific signal sequence, or is a physical channel.

In a second aspect, a wireless communication method is provided, including:

determining configuration information, wherein the configuration information is used to indicate a configuration of a relationship between a detection result of detection of a first signal or channel performed by a terminal device and whether to detect a second signal or channel; and sending the configuration information to the terminal device.

In connection with the second aspect, in a possible implementation manner of the second aspect, the method further includes:

sending the first signal or channel to the terminal device.

In connection with the second aspect or any one of the foregoing possible implementation manners, in a possible implementation manner of the second aspect, the sending the first signal or channel to the terminal device includes:

determining the configuration information according to a service condition of the terminal device and/or a network condition.

In connection with the second aspect or any one of the foregoing possible implementation manners, in a possible implementation manner of the second aspect, the configuration information is used to indicate the configuration of the relationship between the detection result of the first signal or channel and whether to detect the second signal or channel at a specific detection time period or a time point.

In connection with the second aspect or any one of the foregoing possible implementation manners, in a possible implementation manner of the second aspect, the specific detection time period or the specific detection time point is at least one detection time period or time point of periodic detection time periods or time points.

In connection with the second aspect or any one of the foregoing possible implementation manners, in a possible implementation manner of the second aspect, the specific detection time period or the specific detection time point is an on duration in a discontinuous reception DRX cycle; or, the specific detection time point is at least one paging occasion of periodic paging occasions.

In connection with the second aspect or any one of the foregoing possible implementation manners, in a possible implementation manner of the second aspect, the second signal or channel is a physical downlink control channel PDCCH or paging signaling.

In connection with the second aspect or any one of the foregoing possible implementation manners, in a possible implementation manner of the second aspect, the configuration information is carried in a system message, radio resource control RRC dedicated signaling, PDCCH signaling, or a media access control MAC control element CE.

In connection with the second aspect or any one of the foregoing possible implementation manners, in a possible implementation manner of the second aspect, the configuration information is carried in the first signal or channel, and used to configure a relationship between the detection result of at least one first signal or channel after the first signal or channel where the configuration information is located and whether to detect the second signal or channel.

In connection with the second aspect or any one of the foregoing possible implementation manners, in a possible implementation manner of the second aspect, the configuration regarding the relationship between the detection result of the first signal or channel and whether to detect the second signal or channel includes a first configuration.

In connection with the second aspect or any one of the foregoing possible implementation manners, in a possible implementation manner of the second aspect, the first configuration is configured to indicate that the terminal device performs detection of the second signal or channel when the first signal or channel is not found.

In connection with the second aspect or any one of the foregoing possible implementation manners, in a possible implementation manner of the second aspect, the first configuration is used to indicate that the terminal device does not perform the detection of the second signal or channel when the first signal or channel is found.

In connection with the second aspect or any one of the foregoing possible implementation manners, in a possible implementation manner of the second aspect, the first configuration is used to indicate that:

the terminal device performs detection of the second signal or channel when the first signal or channel is found and a first field of the first signal or channel carries a first value; or the terminal device does not perform detection of the second signal or channel when the first signal or channel is found and the first field of the first signal or channel carries a second value.

In connection with the second aspect or any one of the foregoing possible implementation manners, in a possible implementation manner of the second aspect, the configuration made by the network device regarding the relationship between the detection result of the first signal or channel and whether to detect the second signal or channel includes a second configuration.

In connection with the second aspect or any one of the foregoing possible implementation manners, in a possible implementation manner of the second aspect, the second configuration is used to indicate that the terminal device does not perform detection of the second signal or channel when the first signal or channel is not found.

In connection with the second aspect or any one of the foregoing possible implementation manners, in a possible implementation manner of the second aspect, the second configuration is used to indicate that the terminal device performs detection of the second signal or channel when the first signal or channel is found.

In connection with the second aspect or any one of the foregoing possible implementation manners, in a possible implementation manner of the second aspect, the second configuration is used to indicate that:

the terminal device performs detection of the second signal or channel when the first signal or channel is found and a second field of the first signal or channel carries a third value; or the terminal device does not perform detection of the second signal or channel when the first signal or channel is found and the second field of the first signal or channel carries a fourth value.

In connection with the second aspect or any one of the foregoing possible implementation manners, in a possible implementation manner of the second aspect, the first signal or channel is a specific signal sequence, or is a physical channel.

In a third aspect, there is provided a terminal device which is configured to perform the method according to the above first aspect or any of the possible implementation manners of the first aspect. In particular, the terminal device includes functional modules for performing the method of the above first aspect or any of the possible implementation manners of the first aspect.

In a fourth aspect, there is provided a network device configured to perform the method of the above second aspect or any of the possible implementation manners of the second aspect. In particular, the network device includes functional modules for performing the method of the above second aspect or any of the possible implementation manners of the second aspect.

In a fifth aspect, there is provided a terminal device, including: a processor, a memory and a transceiver. The processor, the transceiver and the memory communicate with each other via an internal connection path to transmit control and/or data signals, so that the terminal device performs the method of the above first aspect or any of the possible implementation manners of the first aspect.

In a sixth aspect, there is provided a network device, including: a processor, a memory and a transceiver. The processor, the transceiver and the memory communicate with each other via an internal connection path to transmit control and/or data signals, so that the network device performs the method of the above second aspect or any of the possible implementation manners of the second aspect.

In a seventh aspect, there is provided a computer readable medium for storing a computer program, the computer program including instructions for performing the above first aspect or any of the possible implementation manners of the first aspect.

In an eighth aspect, there is provided a computer readable medium for storing a computer program, the computer program comprising instructions for performing the above second aspect or any of the possible implementation manners of the second aspect.

BRIEF DESCRIPTION OF THE DRAWINGS

In order to more clearly illustrate the technical solutions of the embodiments of the present disclosure, the drawings to be used in the description of the embodiments or the prior art will be briefly described below. Obviously, the drawings in the following description are only some exemplary embodiments of the present disclosure, and those skilled in the art can obtain other drawings according to these drawings without any creative work.

FIG. 1 is a schematic diagram of a wireless communication system according to an embodiment of the present disclosure.

FIG. 2 is a schematic flowchart of a wireless communication method according to an embodiment of the present disclosure.

DETAILED DESCRIPTION

Figure 3:
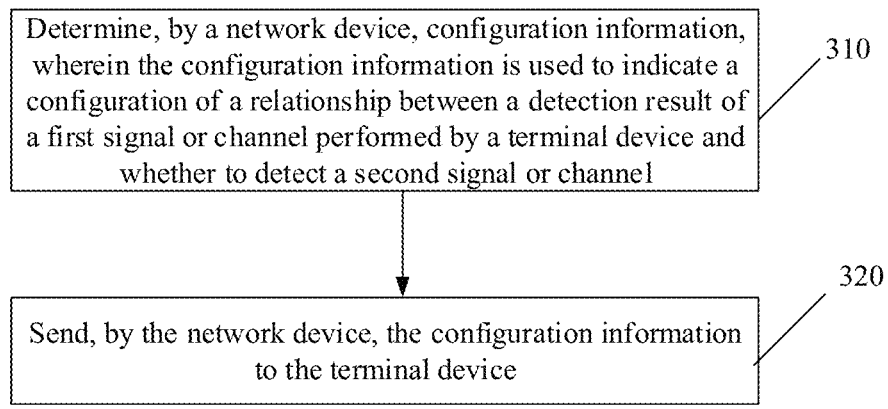
FIG. 3 is a schematic flowchart of a wireless communication method according to an embodiment of the present disclosure.

The technical solutions in the embodiments of the present disclosure are described in conjunction with the drawings in the embodiments of the present disclosure. It should be appreciated that the described embodiments are a part of the embodiments of the present disclosure, and not all of the embodiments. Based on the embodiments in the present disclosure, all other embodiments obtained by those skilled in the art without creative work are within the scope of the present disclosure.

The technical solutions of the embodiments of the present disclosure can be applied to various communication systems, such as a global system of mobile communication (GSM) system, a code division multiple access (CDMA) system, a wideband code division multiple access (WCDMA) system, a general packet radio service (GPRS), a long term evolution (LTE) system, a LTE frequency division duplex (FDD) system, a LTE time division duplex (TDD), an universal mobile telecommunication system (UMTS), a worldwide interoperability for microwave access (WiMAX) communication system, a future 5G communication system (also called as New Radio system, i.e., NR system) and the like.

FIG. 1 shows a wireless communication system 100 to which the embodiments of the present disclosure are applied. The wireless communication system 100 can include a network device 110. The network device 110 can be a device that communicates with a terminal device. The network device 110 may provide communication coverage for a particular geographic area and may communicate with terminal devices (e.g., UEs) within the coverage area. Optionally, the network device 110 may be a base transceiver station (BTS) in the GSM system or the CDMA system, or a node base (NodeB, NB) in the WCDMA system, or an evolutional node base (eNB or eNodeB) in the LTE system, or a wireless controller in a cloud radio access network (CRAN), or the network device may be a relay station, an access point, an in-vehicle device, a wearable device, and a network side device in a future 5G network or a network side device in a future evolutional public land mobile network (PLMN) network.

The wireless communication system 100 also includes at least one terminal device 120 within the coverage of the network device 110. The terminal device 120 can be mobile or fixed. Optionally, the terminal device 120 may be referred to as an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with a wireless communication capability, a computing devices or other processing devices connected to wireless modems, an in-vehicle device, a wearable device, a terminal device in a future 5G networks, or a terminal device in a future evolutional public land mobile network (PLMN), and so on.

Optionally, a device to device (D2D) communication can be performed between the terminal devices 120.

Optionally, the 5G system or network may also be referred to as a new radio (NR) system or network.

FIG. 1 schematically shows one network device and two terminal devices. Optionally, the wireless communication system 100 may include a plurality of network devices, and more or less terminal devices may be included within the coverage area of each network device, which is not limited in the embodiments of the present disclosure.

Optionally, the wireless communication system 100 may further include other network entities, such as a network controller, a mobility management entity, and the like, which is not limited in the embodiments of the present disclosure.

It should be understood that the terms "system" and "network" are used interchangeably herein. The term "and/or" herein is merely a term describing the association relationship of the associated objects, and indicates that there may be three relationships. For example, A and/or B may indicate that: A exists only, both A and B exist, and B exists only. In addition, the character "I" herein generally indicates that the contextual objects are in an "or" relationship.

FIG. 2 is a schematic flowchart of a wireless communication method 200 according to an embodiment of the present disclosure. The method 200 is optionally applicable to the system shown in FIG. 1, but is not limited thereto. As shown in FIG. 2, the method 200 includes at least some of the following contents.

In step 210, the terminal device detects a first signal or channel sent by the network device.

In step 220, the terminal device determines whether to detect a second signal or channel according to a detection result of the first signal or channel, and a configuration made by the network device regarding a relationship between the detection result of the first signal or channel and whether to detect the second signal or channel.

Optionally, the terminal device receives configuration information sent by the network device, wherein the configuration information is used to configure the relationship between the detection result of the first signal or channel and whether to detect the second signal or channel.

Optionally, the first signal or channel is a specific signal sequence or a physical channel.

Optionally, the second signal or channel is a physical downlink control channel (PDCCH) or paging signaling.

FIG. 3 is a schematic flowchart of a wireless communication method 300 according to an embodiment of the present disclosure. The method 300 can be optionally applied to the system shown in FIG. 1, but is not limited thereto. As shown in FIG. 3, the method 300 includes at least some of the following contents.

In step 310, the network device determines the configuration information. The configuration information is used to indicate a configuration of a relationship between a detection result of a first signal or channel performed by a terminal device and whether to detect the second signal or channel.

Optionally, the first signal or channel is a specific signal sequence or a physical channel.

Optionally, the second signal or channel is a physical downlink control channel (PDCCH) or paging signaling.

In step 320, the network device sends the configuration information to the terminal device.

Optionally, the network device sends the first signal or channel to the terminal device.

Therefore, in the embodiments of the present disclosure, the relationship between the detection result about the detection of the first signal or channel performed by the terminal device and whether to detect the second signal or channel can be configured by the network device, so that the terminal device can determine whether to detect the second signal or channel according to the detection result of the first signal or channel and the configuration made by the network device. Therefore, there is no need for the terminal device to detect the second signal or channel at any time when the second signal or the channel may exist, thereby saving the power of the terminal device. Further, the network device can perform the configuration according to the current network condition or the service condition of the terminal device, so that the configuration is performed according to the actual situation, and the service requirement of the terminal device or network can be satisfied while the power of the terminal device is saved.

Optionally, the configuration information is used to indicate a configuration of a relationship between the detection result of the first signal or channel and whether to detect the second signal or channel at a specific detection time period or a specific detection time point.

Optionally, the terminal device may determine whether to detect the second signal or channel at a specific detection time period or at a specific detection time point according to a detection result of the first signal or channel, and a configuration made by the network device regarding a relationship between the detection result of the first signal or channel and whether to detect the second signal or channel.

Optionally, the specific detection time period or the specific detection time point is at least one detection time period or time point of periodic detection time periods or time points.

Optionally, the specific detection time period or the specific detection time point is an on duration in the DRX cycle. Correspondingly, the second signal or channel is a physical downlink control channel PDCCH. Under such condition, the configuration mentioned in the embodiments of the present disclosure may be referred to as a DRX configuration.

Optionally, the terminal device determines whether to detect the second signal or channel in the on duration of a current DRX cycle, according to the detection result of the first signal or channel at a specific time moment or time period in the opportunity for DRX of a previous DRX cycle of the current DRX cycle, and the configuration made by the network device regarding the relationship between the detection result of the first signal or channel and whether to detect the second signal or channel.

Optionally, whether to detect the second signal or channel at a current paging occasion is determined according to the detection result of the first signal or channel at a specific time moment or time period before the current paging occasion and the configuration made by the network device regarding the relationship between the detection result of the first signal or channel and whether to detect the second signal or channel.

The specific time moment or time period before the current paging occasion may be a time moment or a time period that is apart from the paging occasion by a preset time. Or, the specific time moment or time period before the current paging occasion can be a preset time moment or a preset time period.

Optionally, the specific detection time point is at least one paging occasion of periodic paging occasions. Correspondingly, the second signal or channel can be paging signaling.

Optionally, the configuration information is carried in a system message. For example, the configuration information can be carried in a system information block (SIB). For example, the DRX configuration information for paging message transmission can be transmitted in the SIB.

Optionally, the configuration information is carried in radio resource control (RRC) dedicated signaling. For example, the DRX configuration for the RRC connected state may be configured by using the RRC dedicated signaling.

Optionally, the configuration information is carried in PDCCH signaling.

Optionally, the configuration information is carried in a media access control (MAC) control element (CE). The DRX configuration can be changed dynamically by using the PDCCH or the MAC CE to adapt to the DRX configuration for the RRC connected state.

Optionally, the configuration information is carried in the first signal or channel, and used to configure a relationship between the detection result of at least one first signal or channel after the first signal or channel where the configuration information is located and whether to detect the second signal or channel.

Specifically, in the case of the DRX configuration, the network device may send the first signal or channel in the opportunity for DRX of the current DRX cycle. The first signal or channel is used to indicate whether to detect the PDCCH in the on duration in the next DRX cycle. At the same time, the configuration information may be carried in the first signal or channel, and the configuration information is used to indicate the configuration of other signals or channels after the first signal or channel.

In order to understand the present disclosure more clearly, an example will be described below. In the example, the configuration made by the network device regarding the relationship between the detection result of the first signal or channel and whether to detect the second signal or channel includes a first configuration or a second configuration.

Optionally, the first configuration is used to indicate that detection of the second signal or channel is performed when the first signal or channel is not detected.

Optionally, the second configuration is used to indicate that detection of the second signal or channel is not performed when the first signal or channel is not detected.

The network device can make the first configuration or the second configuration according to the service condition of the terminal device or the current network condition.

In order to understand the present disclosure more clearly, the DRX configuration will be described below.

Figure 4:
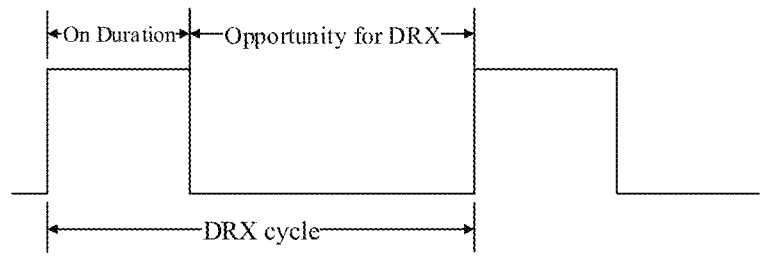
FIG. 4 is a schematic diagram of a DRX cycle according to an embodiment of the present disclosure.

As can be seen from FIG. 4, in the time domain, the time is divided into continuous DRX cycles. One DRX cycle can include an on duration and an opportunity for DRX.

The terminal device can monitor and receive the PDCCH during the "on duration" time period; and the terminal device may not receive the PDCCH to reduce power consumption during the "opportunity for DRX" time period.

However, the terminal device is scheduled opportunistically during the on duration which occurs periodically, and the terminal device can be scheduled in only a few DRX cycles when the service load of the terminal device is low.

For the paging message using the DRX mechanism, the terminal device has even less occasions to receive a paging message.

Therefore, after the DRX mechanism is configured for the terminal device, for PDCCH detection in most on durations, no data scheduling is detected.

For the above problems, the following implementation manner (1) may be used. If the network device determines that the terminal device needs to be scheduled in the DRX on duration, a wake-up signal is sent to the terminal device to wake up the terminal before the DRX cycle; otherwise, the wake-up signal is not sent to the terminal device. The terminal device wakes up only after the wake-up signal is detected to detect the PDCCH and receive data in the DRX on duration; otherwise, the PDCCH detection is not performed. The wake-up signal can further save power of the terminal, but also brings a series of negative effects. For example, whether the terminal device wakes up on time depends on the detection reliability of the wake-up signal, and if the terminal device does not normally detect the wake-up signal sent by the network device, the data transmission in the DRX cycle will be missed, and the time delay of the data service transmission will be further increased on the basis of the DRX. On the other hand, the wake-up of the terminal device depends on the sending of the wake-up signal, and the sending of the wake-up signal itself brings certain resource overhead. In conditions where the service load is relatively high, sending the wake-up signal will strain resources, and even the conflict problem of the sending of the wake-up signal and other transmissions may occur.

For the above problem, the following implementation manner (2) may be used. That is, if the network device determines that the terminal device needs to be scheduled in the DRX on duration, the wake-up signal is not sent to the terminal device; on the contrary, when the network device determines that the terminal device does not need to be scheduled in the DRX on duration, the sleep signal is sent to the terminal device before the DRX cycle to indicate that the terminal does not need to receive the PDCCH in the on duration. In this way, the reliability of the sleep signal has little effect on the terminal device. Even if the sleep signal is occasionally not detected correctly, the data transmission of the terminal device is not influenced, and the terminal device does more PDCCH blind detection than it should do. Similarly, when the system load is high, the network device may give up the transmission of a part of the sleep signals in order to avoid the resource overhead caused by the sleep signals or the conflict of the transmission of the sleep signal with other transmissions. In this way, some compromises between the system overhead and the power consumption of the terminal are made in the network, and the implementation is more flexible. However, the disadvantage of this method is that when the service load of the terminal device is very low, the terminal device may have data scheduling only in a few DRX cycles, and a great reduction in the power consumption of the terminal device depends on sending of the sleep signal before each DRX cycle, which increases the overhead of system resources.

Therefore, for the problems of the foregoing two manners (1) and (2), the network device may configure the indication signal (that is, the first signal or channel) that is subsequently sent. For example, the network device may configure the indication signal as the first configuration, or as a second configuration, or as other configurations.

For ease of understanding, the first configuration and the second configuration will be described in detail below.

First Configuration

Optionally, the first configuration is used to indicate that detection of the second signal or channel is performed when the first signal or channel is not detected.

Optionally, the first configuration is used to indicate detection of the second signal or channel is not performed when the first signal or channel is detected.

For example, when the current service load of the terminal device is high, the configuration made by the network device for the terminal device may include a first configuration: that is, when the first signal or channel is not detected, detection of the second signal or channel is performed. Since the load is high, the probability that the second signal or the channel can be detected or found is high, the first signal or channel can be configured as an indication of not detecting the second signal or channel, thereby reducing the probability of sending the first signal or channel to save the resources.

Optionally, the first configuration is used to indicate that detection of the second signal or channel is performed when the first signal or channel is detected and a first field of the first signal or channel carries a first value; or that detection of the second signal or channel is not performed when the first signal or channel is detected and a first field of the first signal or channel carries a second value.

For example, the first value may be 0 and the second value may be 1. Alternatively, the first value may be 1 and the second value may be 0.

Optionally, the network device may also not configure the meaning of the first field of the first signal or channel, and the meaning of the first field may be specified by a protocol. For example, it may be specified that when the first field is 0, the terminal device needs to detect the second signal or channel, and when the first field is 1, the terminal device does not need to detect the second signal or channel. Alternatively, it may be specified that when the first field is 1, the terminal device needs to detect the second signal or channel, and when the first field is 0, the terminal device does not need to detect the second signal or channel.

Second Configuration

Optionally, the second configuration is used to indicate that detection of the second signal or channel is not performed when the first signal or channel is not detected.

Optionally, the second configuration is used to indicate that detection of the second signal or channel is performed when the first signal or channel is detected.

For example, when the current service load of the terminal device is low, the configuration made by the network device for the terminal device may include the second configuration: that is, when the second signal or channel is not detected, detection of the second signal or channel is not performed. Since the load is low, the probability that the terminal device detects the second signal is low, the first signal or channel can be configured as a trigger for detecting the second signal or channel, thereby reducing the probability of sending the first signal or channel to save the resources.

Optionally, the second configuration is used to indicate that detection of the second signal or channel is performed when the first signal or channel is detected and a second field of the first signal or channel carries a third value; or that detection of the second signal or channel is not performed when the first signal or channel is detected and the second field of the first signal or channel carries a fourth value.

For example, the third value may be 0 and the fourth value may be 1. Alternatively, the third value may be 1 and the fourth value may be 0.

Optionally, the network device may also not configure the meaning of the first field of the first signal or channel, and the meaning of the first field may be specified by a protocol. For example, it may be specified that when the first field is 0, the terminal device does not need to detect the second signal or channel, and when the first field is 1, he terminal device needs to detect the second signal or channel. Alternatively, it may be specified that when the first field is 1, the terminal device does not need to detect the second signal or channel, and when the first field is 0, the terminal device needs to detect the second signal or channel.

In view of the above, embodiments of the present disclosure provide an enhanced DRX transmission method. Specifically, the terminal detects the first signal/channel before the DRX on duration, receives from the network side the configuration signaling regarding the function of the first signal/channel, and the terminal determines whether to wake up and receive downlink data transmission during the DRX on duration by taking the first signal/channel and corresponding configuration signaling into consideration. The network device may determine the transmission of the first signal/channel and set the configuration signaling correspondingly based on whether the terminal device has data and the overall load condition of the network during the DRX on duration. Thus, the receiving power consumption of the terminal device can be reduced on the one hand, and the resource overhead of the first signal can be saved on the other hand.

Figure 5:
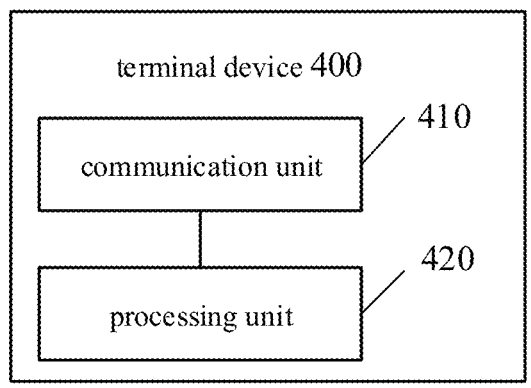
FIG. 5 is a schematic block diagram of a terminal device according to an embodiment of the present disclosure.

FIG. 5 is a schematic block diagram of a terminal device 400 according to an embodiment of the present disclosure. As shown in FIG. 5, the terminal device 400 includes a communication unit 410 and a processing unit 420.

The communication unit 410 is configured to detect a first signal or channel sent by the network device.

The processing unit 420 is configured to determine whether to detect a second signal or channel according to a detection result of the first signal or channel, and a configuration made by the network device regarding a relationship between the detection result of the first signal or channel and whether to detect the second signal or channel.

Optionally, the processing unit 420 is further configured to:
determine whether to detect the second signal or channel at a specific detection time period or at a specific detection time point according to a detection result of the first signal or channel, and a configuration made by the network device regarding a relationship between the detection result of the first signal or channel and whether to detect the second signal or channel.

Optionally, the specific detection time period or the specific detection time point is at least one detection time period or time point of periodic detection time periods or time points.

Optionally, the specific detection time period or the specific detection time point is an on duration in a discontinuous reception DRX cycle; or, the specific detection time point is at least one paging occasion of periodic paging occasions.

Optionally, the processing unit is further configured to:
determine whether to detect the second signal or channel in the on duration of a current DRX cycle, according to the detection result of the first signal or channel at a specific time or time period in the opportunity for DRX of a previous DRX cycle of the current DRX cycle, and the configuration made by the network device regarding the relationship between the detection result of the first signal or channel and whether to detect the second signal or channel; or determine whether to detect the second signal or channel at a current paging occasion according to the detection result of the first signal or channel at a specific time or time period before the current paging occasion and the configuration made by the network device regarding the relationship between the detection result of the first signal or channel and whether to detect the second signal or channel.

Optionally, the second signal or channel is a physical downlink control channel PDCCH or paging signaling.

Optionally, the communication unit 410 is further configured to:
receive configuration information sent by the network device, wherein the configuration information is used to configure the relationship between the detection result of the first signal or channel and whether to detect the second signal or channel.

Optionally, the configuration information is carried in a system message, radio resource control RRC dedicated signaling, PDCCH signaling, or a media access control MAC control element CE.

Optionally, the configuration information is carried in the first signal or channel, and used to configure a relationship between the detection result of at least one first signal or channel after the first signal or channel where the configuration information is located and whether to detect the second signal or channel.

Optionally, the configuration made by the network device regarding the relationship between the detection result of the first signal or channel and whether to detect the second signal or channel includes a first configuration.

The first configuration is used to indicate that detection of the second signal or channel is performed when the first signal or channel is not detected.

Optionally, the first configuration is further used to indicate that detection of the second signal or channel is not performed when the first signal or channel is detected.

Optionally, the first configuration is further used to indicate that detection of the second signal or channel is performed when the first signal or channel is detected and a first field of the first signal or channel carries a first value; or
that detection of the second signal or channel is not performed when the first signal or channel is detected and a first field of the first signal or channel carries a second value.

Optionally, the configuration made by the network device regarding the relationship between the detection result of the first signal or channel and whether to detect the second signal or channel includes a second configuration.

The second configuration is used to indicate that detection of the second signal or channel is not performed when the first signal or channel is not detected.

Optionally, the second configuration is further used to indicate that detection of the second signal or channel is performed when the first signal or channel is detected.

Optionally, the second configuration is further used to indicate that detection of the second signal or channel is performed when the first signal or channel is detected and a second field of the first signal or channel carries a third value; or
that detection of the second signal or channel is not performed when the first signal or channel is detected and the second field of the first signal or channel carries a fourth value.

Optionally, the processing unit 420 is further configured to:
determine whether to detect the second signal or channel according to a preset rule when the first signal or channel is detected; wherein, the preset rule is used to indicate that detection of the second signal or channel is performed when the second field of the first signal or channel carries a fifth value; or detection of the second signal or channel is not performed when the second field of the first signal or channel carries a sixth value.

Optionally, the first signal or channel is a specific signal sequence, or is a physical channel.

It should be understood that the terminal device 400 can carry out corresponding operations performed by the terminal device in the method embodiments, and for brevity, details are not repeated herein again.

Figure 6:
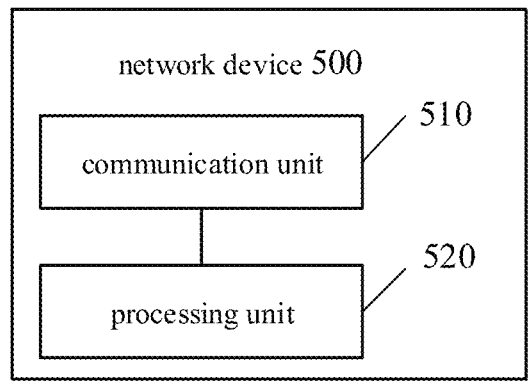
FIG. 6 is a schematic block diagram of a network device according to an embodiment of the present disclosure.

FIG. 6 is a schematic block diagram of a network device 500 according to an embodiment of the present disclosure. As shown in FIG. 6, the network device 500 includes a communication unit 510 and a processing unit 520.

The processing unit 520 is configured to determine configuration information. The configuration information is used to indicate a configuration regarding a relationship between the result of the detection of the first signal or channel performed by the terminal and whether to detect the second signal or channel.

The communication unit 510 is configured to send the configuration information to the terminal device.

Optionally, the communication unit 510 is further configured to send the first signal or channel to the terminal device.

Optionally, the processing unit 520 is further configured to:
determine the configuration information according to a service condition of the terminal device and/or a network condition.

Optionally, the configuration information is used to indicate a configuration of a relationship between the detection result of the first signal or channel and whether to detect the second signal or channel at a specific detection time period or a specific detection time point.

Optionally, the specific detection time period or the specific detection time point is at least one detection time period or time point of periodic detection time periods or time points.

Optionally, the specific detection time period or the specific detection time point is an on duration in a discontinuous reception DRX cycle; or, the specific detection time point is at least one paging occasion of periodic paging occasions.

Optionally, the second signal or channel is a physical downlink control channel PDCCH or paging signaling.

Optionally, the configuration information is carried in a system message, radio resource control RRC dedicated signaling, PDCCH signaling, or a media access control MAC control element CE.

Optionally, the configuration information is carried in the first signal or channel, and used to configure a relationship between the detection result of at least one first signal or channel after the first signal or channel where the configuration information is located and whether to detect the second signal or channel.

Optionally, the configuration made by the network device regarding the relationship between the detection result of the first signal or channel and whether to detect the second signal or channel includes a first configuration.

The first configuration is configured to indicate that the terminal device performs detection of the second signal or channel when the first signal or channel is not detected.

Optionally, the first configuration is further used to indicate that the terminal device does not perform detection of the second signal or channel when the first signal or channel is detected.

Optionally, the first configuration is further used to indicate that the terminal device performs detection of the second signal or channel when the first signal or channel is detected and a first field of the first signal or channel carries a first value; or
that the terminal device does not perform detection of the second signal or channel when the first signal or channel is detected and the first field of the first signal or channel carries a second value.

Optionally, the configuration made by the network device regarding the relationship between the detection result of the first signal or channel and whether to detect the second signal or channel includes a second configuration.

The second configuration is used to indicate that the terminal device does not perform detection of the second signal or channel when the first signal or channel is not detected.

Optionally, the second configuration is further used to indicate that the terminal device performs detection of the second signal or channel when the first signal or channel is detected.

Optionally, the second configuration is further used to indicate that the terminal device performs detection of the second signal or channel when the first signal or channel is detected and a second field of the first signal or channel carries a third value; or
that the terminal device does not detect the second signal or channel when the first signal or channel is detected and the second field of the first signal or channel carries a fourth value.

Optionally, the first signal or channel is a specific signal sequence, or is a physical channel.

It should be understood that the network device 500 can carry out corresponding operations performed by terminal device in the method embodiments, and for brevity, details are not described herein again.

Figure 7:
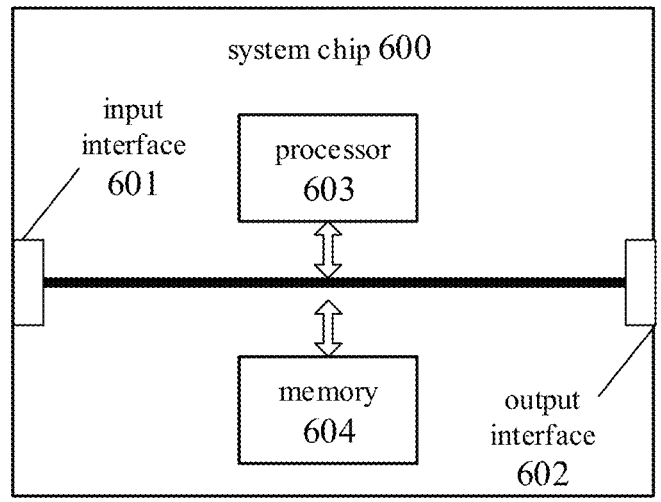
FIG. 7 is a schematic block diagram of a system chip according to an embodiment of the present disclosure.

FIG. 7 is a schematic structural diagram of a system chip 600 according to an embodiment of the present disclosure. The system chip 600 of FIG. 7 includes an input interface 601, an output interface 602, at least one processor 603, and a memory 604, which are connected to each other through an internal connection path. The processor 603 is used to execute codes in the memory 604.

Optionally, when the codes are executed, the processor 603 may carry out the methods performed by the network device in the method embodiments. For the sake of brevity, repeated descriptions are omitted here.

Optionally, when the codes are executed, the processor 603 may carry out the methods performed by the terminal device in the method embodiments. For the sake of brevity, repeated descriptions are omitted here.

Figure 8:
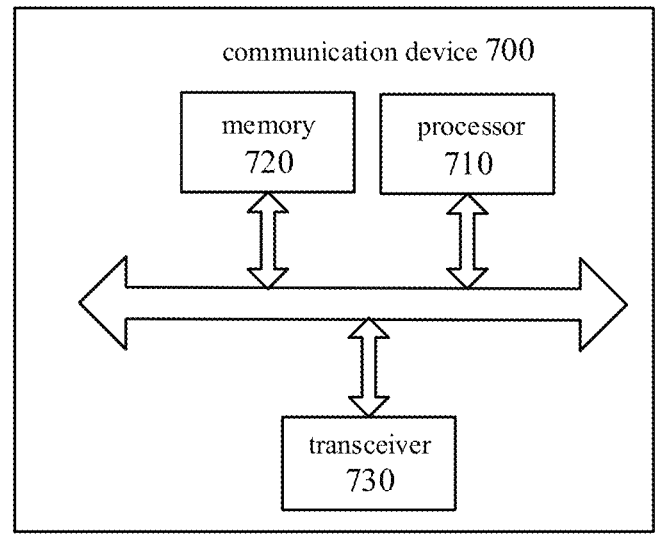
FIG. 8 is a schematic block diagram of a communication device according to an embodiment of the present disclosure.

FIG. 8 is a schematic block diagram of a communication device 700 according to an embodiment of the present disclosure. As shown in FIG. 8, the communication device 700 includes a processor 710 and a memory 720. The memory 720 can store program codes, and the processor 710 can execute the program codes stored in the memory 720.

Optionally, as shown in FIG. 8, the communication device 700 can include a transceiver 730, and the processor 710 can control the transceiver 730 to communicate with other external devices.

Optionally, the processor 710 can call the program codes stored in the memory 720 to perform the corresponding operations of the network device in the method embodiments. For brevity, repeated descriptions are omitted herein.

Optionally, the processor 710 can call the program code stored in the memory 720 to perform the corresponding operations of the terminal device in the method embodiments. For brevity, repeated descriptions are omitted herein.

It should be understood that the processor in the embodiments of the present disclosure may be an integrated circuit chip with signal processing capability. In the implementation process, each step of the foregoing embodiment of the method may be completed by an integrated logic circuit of hardware in a processor or an instruction in a form of software. The processor described above may be a general-purpose processor, a digital signal processor (DSP), an application specific integrated circuit (ASIC), a field programmable gate array (FPGA), or other programmable logic devices, a discrete gate or a transistor logic device, a discrete hardware component, which can implement or execute the disclosed methods, steps and logic blocks in the embodiments of the present disclosure. The general purpose processor may be a microprocessor or the processor may be any conventional processor or the like. The steps of the method disclosed in the embodiments of the present disclosure may be directly performed by the hardware in the decoding processor, or may be performed by using a combination of the hardware and software modules in the decoding processor. The software module can be located in a conventional storage medium such as a random access memory, a flash memory, a read only memory, a programmable read only memory or an electrically erasable programmable memory, a register, and the like. The storage medium is located in the memory and the processor reads information in the memory and completes the steps of the above-described methods with its hardware.

It can be understood that the memory in the embodiments of the present disclosure can be a volatile memory or a non-volatile memory, or can comprise both volatile memory and non-volatile memory. The non-volatile memory can be a Read-Only Memory (ROM), a Programmable ROM (PROM), an Erasable PROM (EPROM), an Electrically EPROM (EEPROM) or a flash memory. The volatile memory can be a Random Access Memory (RAM) that serves as an external cache. By exemplary rather than limiting way, many forms of RAMs can be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories in the systems and methods described herein are intended to comprise, but not limited to, these and any other suitable types of memories.

Those of ordinary skill in the art will appreciate that the exemplary units and algorithm steps described according to the embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A wireless communication method, comprising:
   receiving configuration information sent by a network device, wherein the configuration information is used to configure a relationship between a detection result of a first signal or channel and whether to detect a second signal or channel, wherein the first signal or channel is a specific signal sequence or a physical channel, and the second signal or channel is a physical downlink control channel (PDCCH);
   performing detection of the first signal or channel sent by the network device; and
   determining whether to detect the second signal or channel according to the detection result of the first signal or channel and the configuration information.

2. The method according to claim 1, wherein determining whether to detect the second signal or channel comprises:
   determining whether to detect the second signal or channel at a specific detection time period or a specific detection time point according to the detection result of the first signal or channel and the relationship between the detection result of the first signal or channel and whether to detect the second signal or channel configured by the configuration information;
   wherein the specific detection time period or the specific detection time point is at least one detection time period or time point in periodic detection time periods or time points;
   wherein the specific detection time period or the specific detection time point is an on duration in a discontinuous reception (DRX) cycle; or, the specific detection time point is at least one paging occasion in periodic paging occasions.

3. The method according to claim 2, wherein determining whether to detect the second signal or channel comprises:
  determining whether to detect the second signal or channel in the on duration of a current DRX cycle, according to the detection result of the first signal or channel at a specific time or time period in an opportunity for DRX of a previous DRX cycle of the current DRX cycle, and the relationship between the detection result of the first signal or channel and whether to detect the second signal or channel configured by the configuration information; or
  determining whether to detect the second signal or channel at a current paging occasion, according to the detection result of the first signal or channel at a specific time or time period before the current paging occasion and the relationship between the detection result of the first signal or channel and whether to detect the second signal or channel configured by the configuration information;
  wherein the configuration information is carried in a system message, Radio Resource Control (RRC) dedicated signaling, PDCCH signaling, or a Media Access Control (MAC) Control Element (CE).

4. The method according to claim 1, wherein the configuration information comprises a first configuration;
  wherein the first configuration is used to indicate that detection of the second signal or channel is performed when the first signal or channel is not detected; and/or
  wherein the first configuration is further used to indicate that detection of the second signal or channel is not performed when the first signal or channel is detected.

5. The method according to claim 1, wherein the configuration information comprises a first configuration;
  wherein the first configuration is used to indicate that detection of the second signal or channel is performed when the first signal or channel is detected and a first field of the first signal or channel carries a first value; or
  wherein the first configuration is used to indicate that detection of the second signal or channel is not performed when the first signal or channel is detected and the first field of the first signal or channel carries a second value.

6. The method according to claim 1, wherein the configuration information comprises a second configuration;
  wherein the second configuration is used to indicate that detection of the second signal or channel is not performed when the first signal or channel is not detected; and/or
  wherein the second configuration is further used to indicate that detection of the second signal or channel is performed when the first signal or channel is detected.

7. The method according to claim 1, wherein the configuration information comprises a second configuration;
  wherein the second configuration is used to indicate that detection of the second signal or channel is performed when the first signal or channel is detected and a second field of the first signal or channel carries a third value; or
  wherein the second configuration is used to indicate that detection of the second signal or channel is not performed when the first signal or channel is detected and the second field of the first signal or channel carries a fourth value.

8. A wireless communication method, comprising:
  determining configuration information, wherein the configuration information is used to configure a relationship between a detection result of a first signal or channel performed by a terminal device and whether to detect a second signal or channel, wherein the first signal or channel is a specific signal sequence or a physical channel, and the second signal or channel is a physical downlink control channel (PDCCH); and
  sending the configuration information to the terminal device.

9. The method according to claim 8, wherein the method further comprises:
  sending the first signal or channel to the terminal device.

10. The method according to claim 9, wherein sending the first signal or channel to the terminal device comprises:
  determining the configuration information according to a service condition of the terminal device and/or a network condition.

11. The method according to claim 8, wherein the configuration information is used to indicate a configuration of the relationship between the detection result of the first signal or channel and whether to detect the second signal or channel at a specific detection time period or a specific detection time point;
  wherein the specific detection time period or the specific detection time point is at least one detection time period or time point in periodic detection time periods or time points;
  wherein the specific detection time period or the specific detection time point is an on duration in a discontinuous reception DRX cycle; or, the specific detection time point is at least one paging occasion in periodic paging occasions.

12. The method according to claim 8, wherein the configuration information is carried in a system message, Radio Resource Control (RRC) dedicated signaling, PDCCH signaling, or a Media Access Control (MAC) Control Element (CE).

13. The method according to claim 8, wherein the configuration information comprises a first configuration;
  wherein the first configuration is configured to indicate that the terminal device performs detection of the second signal or channel when the first signal or channel is not detected; and/or
  wherein the first configuration is further used to indicate that the terminal device does not perform the detection of the second signal or channel when the first signal or channel is detected.

14. The method according to claim 8, wherein the configuration information comprises a first configuration;
  wherein the first configuration is used to indicate that the terminal device performs the detection of the second signal or channel when the first signal or channel is detected and a first field of the first signal or channel carries a first value; or
  wherein the first configuration is used to indicate that the terminal device does not perform the detection of the second signal or channel when the first signal or channel is detected and the first field of the first signal or channel carries a second value.

15. The method according to claim 8, wherein the configuration information comprises a second configuration;
  wherein the second configuration is used to indicate that the terminal device does not perform the detection of the second signal or channel when the first signal or channel is not detected; and/or wherein the second configuration is further used to indicate that the terminal device performs the detection of the second signal or channel when the first signal or channel is detected.

16. The method according to claim 8, wherein the configuration information comprises a second configuration;

wherein the second configuration is used to indicate that the terminal device performs the detection of the second signal or channel when the first signal or channel is detected and a second field of the first signal or channel carries a third value; or wherein the second configuration is used to indicate that the terminal device does not perform the detection of the second signal or channel when the first signal or channel is detected and the second field of the first signal or channel carries a fourth value.

17. A terminal device, comprising:
a processor;
a memory for storing programs executable by the processor; and
a transceiver;
wherein:
the transceiver is configured to receive configuration information sent by a network device, wherein the configuration information is used to configure a relationship between a detection result of a first signal or channel and whether to detect a second signal or channel, wherein the first signal or channel is a specific signal sequence or a physical channel, and the second signal or channel is a physical downlink control channel (PDCCH);
the transceiver is further configured to perform detection of the first signal or channel sent by the network device; and
the processor is configured to determine whether to detect the second signal or channel according to the detection result of the first signal or channel and the configuration information.

18. The terminal device according to claim 17, wherein the configuration information is carried in a system message, Radio Resource Control (RRC) dedicated signaling, PDCCH signaling, or a Media Access Control (MAC) Control Element (CE).

19. The terminal device according to claim 17, wherein the configuration information comprises a first configuration;
wherein the first configuration is used to indicate that detection of the second signal or channel is performed when the first signal or channel is not detected; and/or
wherein the first configuration is further used to indicate that detection of the second signal or channel is not performed when the first signal or channel is detected.

20. The terminal device according to claim 17, wherein the configuration information comprises a second configuration;
wherein the second configuration is used to indicate detection of the second signal or channel is not performed when the first signal or channel is not detected; and/or
wherein the second configuration is further used to indicate that detection of the second signal or channel is performed when the first signal or channel is detected.

21. A network device, comprising:
a processor;
a memory for storing programs executable by the processor; and
a transceiver;
wherein:
the processor is configured to determine configuration information, wherein the configuration information is used to configure a relationship between a detection result of a first signal or channel performed by a terminal device and whether to detect a second signal or channel, wherein the first signal or channel is a specific signal sequence or a physical channel, and the second signal or channel is a physical downlink control channel (PDCCH); and
the transceiver is configured to send the configuration information to the terminal device.

22. The network device according to claim 21, wherein the processor is further configured to:
determine the configuration information according to a service condition of the terminal device and/or a network condition.

23. The network device according to claim 21, wherein the configuration information is carried in a system message, Radio Resource Control (RRC) dedicated signaling, PDCCH signaling, or a Media Access Control (MAC) Control Element (CE).

24. The network device according to claim 21, wherein the configuration information comprises a first configuration;
wherein the first configuration is configured to indicate that the terminal device performs detection of the second signal or channel when the first signal or channel is not detected; and/or
wherein the first configuration is further used to indicate that the terminal device does not perform detection of the second signal or channel when the first signal or channel is detected.

25. The network device according to claim 21, wherein the configuration information comprises a first configuration;
wherein the first configuration is used to indicate that the terminal device performs detection of the second signal or channel when the first signal or channel is detected and a first field of the first signal or channel carries a first value; or
wherein the first configuration is used to indicate that the terminal device does not perform the detection of the second signal or channel when the first signal or channel is detected and the first field of the first signal or channel carries a second value.

26. The network device according to claim 21, wherein the configuration information comprises a second configuration;
wherein the second configuration is used to indicate that the terminal device does not perform detection of the second signal or channel when the first signal or channel is not detected;
and/or wherein the second configuration is further used to indicate that the terminal device performs detection of the second signal or channel when the first signal or channel is detected.

27. The network device according to claim 21, wherein the configuration information comprises a second configuration;
wherein the second configuration is used to indicate that the terminal device performs detection of the second signal or channel when the first signal or channel is detected and a second field of the first signal or channel carries a third value; or
wherein the second configuration is used to indicate that the terminal device does not perform detection of the second signal or channel when the first signal or channel is detected and the second field of the first signal or channel carries a fourth value.

* * * * *